Jan. 22, 1924. 1,481,645
P. KAMINSKI
ELECTRIC TELECONTROL ARRANGEMENT FOR POWER DEVICES
Filed Aug. 24, 1921 6 Sheets-Sheet 1

Inventor
Paul Kaminski
by Knight Bros
attorneys

Jan. 22, 1924. 1,481,645
P. KAMINSKI
ELECTRIC TELECONTROL ARRANGEMENT FOR POWER DEVICES
Filed Aug. 24, 1921 6 Sheets-Sheet 2

Jan. 22, 1924.                                                    1,481,645
                          P. KAMINSKI
            ELECTRIC TELECONTROL ARRANGEMENT FOR POWER DEVICES
                    Filed Aug. 24, 1921          6 Sheets-Sheet 6

Patented Jan. 22, 1924.

1,481,645

UNITED STATES PATENT OFFICE.

PAUL KAMINSKI, OF BERLIN-PANKOW, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

ELECTRIC TELECONTROL ARRANGEMENT FOR POWER DEVICES.

Application filed August 24, 1921. Serial No. 495,143.

(GRANTED UNDER THE PROVISIONS OF THE ACT OF MARCH 3, 1921, 41 STAT. L., 1313.)

*To all whom it may concern:*

Be it known that I, PAUL KAMINSKI, a citizen of the German Empire, residing at Berlin-Pankow, Germany, have invented certain new and useful Improvements in Electric Telecontrol Arrangements for Power Devices (for which I have filed applications in Germany, August 22, 1916, Pat. No. S. 45,676; October 21, 1916, Ser. No. 45,916; November 23, 1916, Pat. No. S. 46,033; Sweden, June 19, 1920, Ser. No. 2,779/20; Norway, June 21, 1920, Ser. No. 20,623; Italy, June 29, 1920, Ser. No. 39,169; Japan, July, 9, 1920, Ser. No. 58,692; Denmark, July 24, 1920, Ser. No. 2,331/20; Spain, July 30, 1920, Patent No. 75,098), of which the following is a specification.

Arrangements of a rather complicated nature have been proposed hitherto for suddenly arresting the movements of heavy cannon controlled from a distance by electrical devices. These arrangements comprise a transmitter at the commander's position and a receiver associated with the controlled gun and adapted to respond to movements of the transmitter so as to close the circuits of electromagnets which, in turn, control a medium (water) under pressure that moves the gun, the said circuits being arranged to be reopened when the gun reaches the desired position.

The object of the present invention is to simplify these arrangements. This is accomplished either by effecting the coarse and fine adjustments when aiming by means of two separable electromagnetically actuated pressure-medium controlling devices (valves) that govern a common gun-setting member, or by causing the electromagnets for effecting the coarse and fine adjustments to affect a common pressure-medium controlling device in different ways and to govern the gun-setting member accordingly. The arrangement may also be such that the valve for coarse adjustments allows the pressure-medium to flow unthrottled into the operating cylinder of the gun-setting member, while the valve for fine adjustments throttles the said medium considerably before allowing it to pass into the said cylinder. With this arrangement also one and the same valve may be employed for the coarse and fine adjustments.

In arrangements employed hitherto for the remote control of heavy cannon the valves or equivalent devices used for controlling the pressure medium were actuated directly by an electromagnet or a hydraulic piston. If electromagnets were used for effecting the large motions required, their armatures had to execute large strokes, or motors operating through gear effecting a great change of speed had to be used.

Another object of the invention is to enable small, light, quick-acting magnets to be employed for the large as well as the small motions. This is accomplished by causing the electric telecontrol operations by which the coarse adjustments are obtained to affect a small preliminary valve which in turn controls the heavy main valve by means of water or another liquid under pressure. The fine adjustments only involve small movements in any case and these small movements may be imparted directly to the valve for fine adjustments, or to the main valve as the case may be.

In the case of an arrangement in which there are separate valves for effecting the coarse and fine adjustments, or in other words a separate "coarse valve" and "fine valve", the total number of valves required in accordance with the invention will be three viz a telecontrolled "fine valve", a telecontrolled preliminary valve, and a "coarse valve" governed through the preliminary valve by means of the power agency itself, which latter may be water or glycerin under pressure. In cases in which there is only a single large valve for the coarse and fine adjustments, the coarse adjustments are effected in accordance with the invention by a telecontrolled preliminary valve associated with the said large valve, while the telecontrolled magnets for the fine adjustments cooperate with this valve direct.

The scope of the invention is of course independent of the type of device employed for controlling the pressure medium. These devices may consist of slide valves, rotary valves, or of valves moved in the opposite direction to the force exerted by the pressure medium.

In most cases the gun-setting member should be capable of operating in two directions, as in elevating the gun for instance, when the tube has to be raised and lowered. The devices for controlling the pressure-medium must then also be arranged to act in two directions and this necessitates the restoration of these devices to a middle normal position after each setting operation. To this end springs may be employed which act in such a manner that on the pressure-medium controlling device being operated a spring is tensioned which, as soon as the power that operates the device ceases to act, restores the device to its normal middle position. This restoration may however, be effected by the pressure-medium (i. e., by hydraulic power for example) instead of a spring. In accordance with the invention small valves are restored to normal by spring power and the large valves by hydraulic power.

In many cases, particularly in directing cannon, it is necessary to be able to alter the speed of setting at will. This is accomplished in accordance with this invention by providing throttle valves in the supply or discharge pipes through which the pressure medium is sent. The greater the throttling effect the smaller the speed of setting will be.

Another feature of the invention consists in means for moving these valves through the medium of telecontrol gear. An arrangement of this kind may be particularly useful in cases in which an observer suddenly discovers a new target and all the guns directed by the telecontrol gear should be pointed at the new target with the least possible loss of time. In a case like this the observer, in order to accelerate the speed of setting the guns, would immediately put any throttle device that might have been turned on out of operation by means of a controlling device at his position.

Still another feature of the invention consists of a manual control gear which can be put into operation in cases when the electrical telecontrol gear gets out of order. This manual gear may be associated with the coarse adjustment valve or the preliminary or auxiliary valve. It is not arranged to affect the fine adjustment valve, because when the coarse adjustment valve is worked by hand fine adjustments can be obtained by it in any case, i. e., it can be made to exert any desired throttling effect without the aid of the fine adjustment valve. This regulation of the throttling effect may also be accomplished with the aid of the aforesaid throttle valves.

Another feature of the invention refers to means for preventing a valve from oscillating past its normal position. To this end the speed of closure imparted to the movable member of the main valve, when retracted into its normal position by a spring, piston or the like, is lowered to zero by its being caused to strike against a stop that is associated with the fine adjustment gear. The speed of closure of the valve under the subsequent control of the fine adjustment gear then depends solely on the power of the restoring springs or the like which moves the valve rod for the short distance of the stroke of the armature of the fine adjustment magnet.

Some constructional forms of the invention are illustrated in the drawing.

Figure 1:
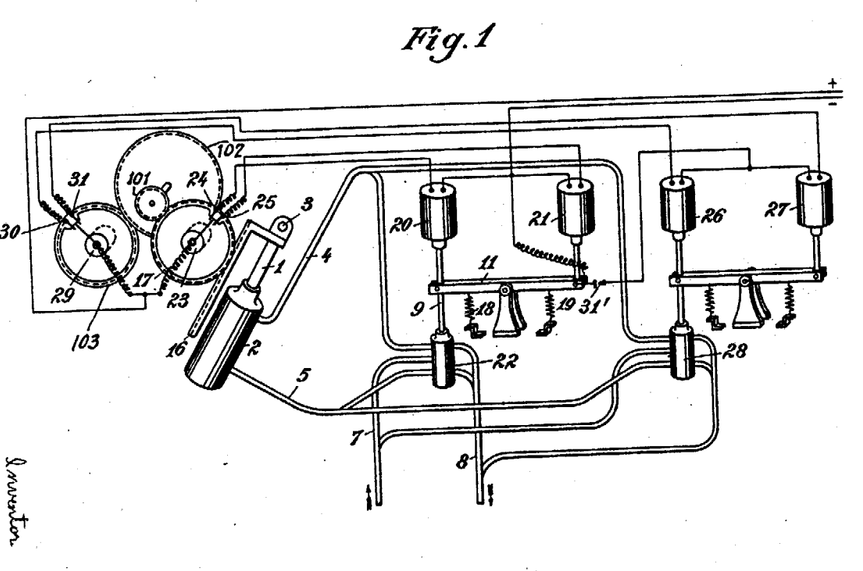
Fig. 1 is a diagram of a gun-controlling arrangement in which separate pressure-medium controlling devices (valves) are employed for effecting the coarse and fine adjustments.

In Fig. 1, in which the coarse and fine adjustments are obtained by means of separate valves, 1 is a piston rod adapted to be moved by a pressure-medium acting on a piston in the cylinder 2. The rod 1 is attached to a gun (not shown) by an eye 3. The pressure-medium is conducted to the cylinder 2 through a slide valve 22 and pipes 4, 5. The pressure-medium enters the slide valve 22 through a pipe 7 and when flowing out of the cylinder 2 from the spaces above and below the piston it passes through the pipe 8. The rod 9 of the valve piston is actuated directly by an electromagnet 20 and also indirectly through a two-armed lever 11 by an electromagnet 21. The circuits of the electromagnets 20 and 21 are controlled by a receiver 23. This receiver is adapted to effect the coarse adjustments when the gun is elevated and will therefore be called the "coarse receiver". It is set by means of a "rough transmitter" (not shown) situated at the fire control officer's position. According as the receiver 23 is rotated clockwise or counterclockwise a middle contact finger will make contact with a peripheral contact 24 or 25 and the electromagnet 20 or 21 respectively will thus be energized to cause the pressure-medium to flow into the space above or below the piston of cylinder 2. By the lowering or raising of the piston rod 1 caused hereby the gun attached to the rod is elevated in the desired manner and at the same time a rack 16 carried by the rod 1 turns a spurwheel 17 which thus turns its peripheral contacts in the direction in which the contact finger of the receiver 23 was rotated until the particular contact made is reopened. When the circuit of the particular energized electromagnet is opened the corresponding slide valve (say 22) is restored by springs 18, 19 to its normal middle position in which it stops the flow of the pressure medium.

The parts controlled by the "fine receiver" 29 operate in practically the same manner as those affected by the "coarse receiver". When the coarse adjustment has been completed it may happen that the contact finger of the receiver 29 is still touching one of the peripheral contacts 30 or 31. The corresponding magnet 26 or 27 affects the slide valve 28 for fine adjustments (hereinafter called the "fine slide valve") which only permits small quantities of pressure-medium to flow through the pipes connected to the pipes 4 and 5, and into the cylinder 2, and therefore only gives rise to slow movements of the rod 1. When a displacement involves a large travel and therefore the operation of the coarse adjustment gear the fine adjustment gear is switched off automatically by the contact 31'. As shown in the figure the circuit of the fine adjustment magnets 26 and 27, traced over the contact 31' is only closed in the middle, normal position of the lever of the coarse adjustment magnets. The contact 31' automatically opens when the lever 11 is displaced from its middle position by energizing one of the two magnets 20 and 21 for the coarse adjustment.

The spur-wheel 17 carrying the contacts 24 and 25 is rotated in a counter clock-wise direction by elevating the gun. The spur-wheel 17 meshes with a spur-wheel 101 rotatably mounted in the apparatus casing. Coaxially arranged and fixed to the shaft of the wheel 101 is the spur-wheel 102 gearing with the spur-wheel 103. Thus spur-wheel 103 rotates in the same (for instance, for elevating the gun counter clock-wise) direction as the spur-wheel 17, carries the contacts 30 and 31 cooperating with the middle contact of the receiver 29 for the fine adjustment. By operating the transmitter (not shown) at the observation station first the contacts of the transmitter 29 of the fine adjustment are closed and then, after a brief interval when large motions are required the contacts of the transmitter 23 for the coarse adjustment will close.

Figure 2:
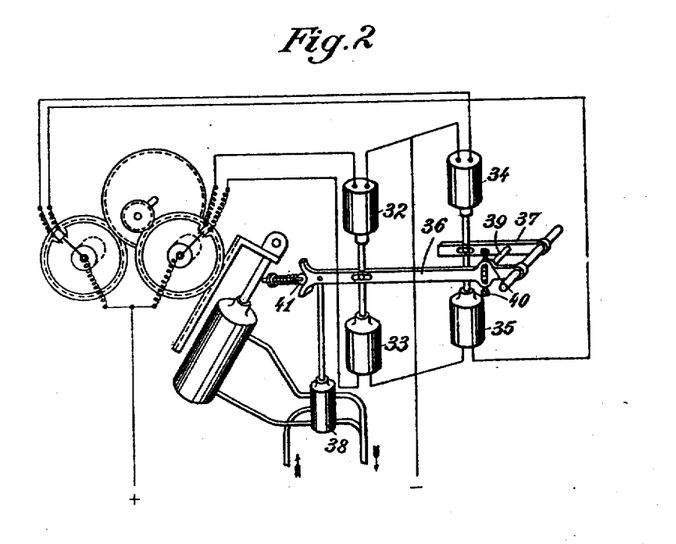
Fig. 2 shows a modified arrangement for coarse and fine-adjustments in which there is only a single valve for effecting the coarse and fine adjustments.

Fig. 2 also represents a gun-controlling arrangement for coarse and fine adjustments, but its electromagnets 32, 33 associated with the coarse adjustment gear for raising and lowering the gun, and its electromagnets 34, 35 associated with the fine adjustment gear act through a lever arrangement 36, 37 on a single or common slide valve 38. This gun-controlling arrangement operates in practically the same manner as that of Fig. 1. When the fine adjustment is effected the electromagnets 34, 35 rock the lever 37 with its carrier pin 39 and this moves the lever 36. The amount of movement imparted to the lever 36 by the lever 37 may be varied or adjusted by the screw tappets 40. The slide valve 38 is restored to its middle normal position by a spring-actuated plunger 41.

Figure 3:
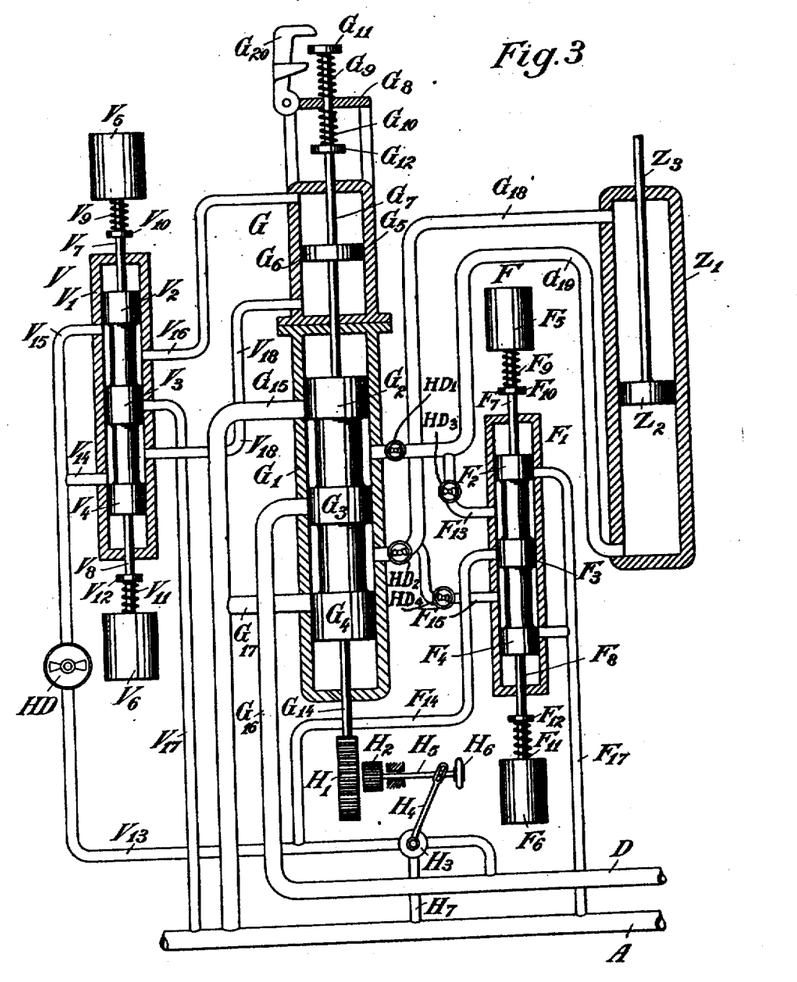
Fig. 3 illustrates a section of a pressure-medium controlling gear or hydraulic valve arrangement comprising three separate valves, viz a preliminary or auxiliary valve, a main valve for coarse adjustments, and a valve for fine adjustments.

Fig. 3 shows a pressure-medium controlling gear comprising three separate slide valves, viz, a preliminary or auxiliary valve V, a main valve G controlled by the auxiliary valve and adapted to effect coarse adjustments, and a valve F for fine adjustments. $Z_1$ is the hydraulic operating (or gun-setting) cylinder, whose piston $Z_2$ moves the load by means of the piston rod $Z_3$. All parts are shown in their middle or normal positions.

Let it be assumed that the load or piston $Z_2$ is to be raised. The fine magnet $F_6$ will be energized first so that the slide valve $F_2$, $F_3$, $F_4$ of the fine adjustment gear will be drawn downward. Hence the pressure-medium will flow from the pressure pipe E through the open cock $H_3$ and the pipes $F_{14}$, $F_{13}$, $G_{19}$ into the space beneath the piston $Z_2$. As the passages and pipes through which the pressure-medium passes are narrow the piston $Z_2$ or load is raised slowly. The pressure-medium occupying the space above the piston $Z_2$ flows out of the cylinder through $G_{18}$, $F_{15}$, $F_{17}$ into the discharge pipe A. After a brief interval has elapsed, determined by the aforementioned difference in time, the contacts of the coarse receiver close later than those of the fine receiver, and the magnet $V_5$ associated with the preliminary valve will also be energized so that the preliminary valve $V_2$, $V_3$, $V_4$ is raised. Pressure-medium will now flow from the pressure pipe D through the open cock $H_3$ and the pipes $V_{13}$, $V_{15}$, $V_{16}$ into the space above the piston $G_6$. The liquid beneath the piston $G_6$ flows out through the pipes $V_{18}$, $V_{17}$ and into the discharge pipe A. The piston $G_6$ therefore pushes down the main or coarse slide valve $G_2$, $G_3$, $G_4$ so that the pressure medium passes from the pressure or supply pipe D through the pipes $G_{16}$, $G_{19}$ into the space beneath the piston $Z_2$.

No throttling effect is exerted by the passages $G_{16}$, $G_{19}$, etc., so that the load is now raised quickly. As soon as it arrives in the neighbourhood of the desired position the magnet $V_5$ will be deenergized by the opening of a corresponding contact. When the preliminary slide valve was raised a spring $V_9$ was tensioned by a plate $V_{10}$ fixed to the valve rod $V_7$. When the magnet $V_5$ is deenergized the spring $V_9$ pushed the preliminary slide valve $V_2$, $V_3$, $V_4$ back into the middle or normal position in which it is shown in the drawing but not beyond this position, because when it arrives there a plate $V_{12}$ fixed to the valve rod $V_8$ strikes against a spring $V_{11}$ which prevents the valve from moving beyond the middle position. When the valve is thus restored to its middle position the pressure-medium flows from D via the passages $H_3$, $V_{13}$, $V_{14}$, $V_{18}$ into the space beneath the piston $G_6$, so that this piston is relieved of the weight of the slide valve by hydraulic power. When the piston $G_6$ was forced down a plate $G_{11}$ fixed to the valve rod $G_7$ had tensioned a spring $G_9$ by pressing it down against the disk $G_8$. Hence when the piston $G_6$ is relieved of its load by hydraulic power the spring $G_9$ pushes the valve $G_2$, $G_3$, $G_4$ back into its middle position and another spring $G_{10}$ prevents it from travelling beyond this position by striking a plate $G_{12}$ which is also firmly fixed on the valve rod $G_7$.

In its middle position the piston ring $G_3$ of the coarse slide valve cuts off the pressure medium from the cylinder $G_1$ by blocking the mouth of the pipe $G_{16}$, and the piston rings $G_2$ and $G_4$ block the discharge pipes $G_{15}$ and $G_{17}$. Since the fine slide valve F is still open the piston $Z_2$ is now affected by this valve alone and the load is kept moving forward slowly. When it reaches the desired position the circuit of the magnet $F_6$ is opened. Since a spring $F_{11}$ was tensioned during the downward motion of the fine valve by means of a plate $F_{12}$ fixed to the valve rod $F_8$, the said spring $F_{11}$ will push the fine valve back into its middle position when the magnet $F_6$ is deenergized. Another spring $F_9$ prevents the valve being flung beyond its middle position, a plate $F_{10}$ firmly fixed to the valve rod $F_7$ being arranged to bump against this spring as shown. In this middle position the piston rings $F_2$, $F_3$, $F_4$ prevent the flow of pressure-medium towards and from the cylinder $Z_1$, so that the piston $Z_2$ comes to a standstill. Instead of the fine valve completely cutting off the pressure medium it could be arranged to act in a similar manner to the preliminary valve V which connects the spaces at both sides of the piston to the supply pipe when it is in its middle position.

If the load is to be shifted in the opposite direction (i. e., if gun is to be swung down) the magnets $F_5$ and $V_6$ instead of $F_6$ and $V_5$ are energized by means of the telecontrol gear, and it will be obvious without any further explanation that the hydraulic control gear will then operate to cause a lowering of the piston $Z_2$ in the operating or gun-setting cylinder $Z_1$.

As the valves are always moved into their extreme or end position by the magnets, the passages are always completely opened and the load is always displaced at practically the same speed. But it may be desirable in some cases to vary the speed of travel of the load. This may be accomplished by stops attached to the valve rods. Thus a stop $G_{20}$ may be arranged in the path of the piston rod $G_7$ so as to prevent the coarse valve from fully opening the passages leading into and out of it. But a simple and more flexible speed regulation can be obtained by retarding the flow of the pressure-medium. To this end a cock HD, which may be opened or closed to any extent, is inserted in the supply pipe $V_{13}$. According as this cock is opened more or less a smaller or greater retarding effect is exerted on the pressure medium flowing into the cylinder $G_5$ and the speed of travel of the piston $G_6$ can thus be regulated. The travelling speed of piston $Z_2$ is, therefore, regulated too.

Such a retarding device in the pipe $V_{13}$ will affect both the raising and lowering of the load. If it be desired to retard the upward travel only, the cock $HD_1$ would be arranged in the pipe $G_{19}$; and if the upward and downward travel are to be retarded at will a cock would be inserted in each of the pipes $G_{18}$ and $G_{19}$ as shown in Fig. 3 at $HD_1$, $HD_2$ respectively. These throttle valves or cocks are preferably inserted between the exits from the cylinder $G_1$ leading into $G_{18}$, $G_{19}$, and the branch pipes $F_{13}$ and $F_{15}$ of the fine adjustment gear.

In the case of a breakdown of the telecontrol gear a local manual control gear can be put into operation. But when this is done the telecontrol gear must be made ineffective so as to prevent the manual control gear and the telecontrol gear from counteracting each other after the cause of trouble has been removed.

The manual control gear shown in Fig. 3 comprises a rack $H_1$ and pinion $H_2$. The rack $H_1$ is attached to the piston rod $G_{14}$ of the coarse valve G and the pinion $H_2$ is mounted at the end of a shaft $H_5$ which has a hand wheel $H_6$ at its other end and may be displaced longitudinally. To put the manual control gear into operation the shaft $H_5$ is shifted towards the left so as to cause the toothed wheel $H_2$ to engage with the rack $H_1$. The coarse valve can then be actuated by the handwheel $H_6$. The shifting of the pinion $H_2$ or shaft $H_5$ to the left also results in the throwing of a lever $H_4$ to close the cock $H_3$ with which it is connected. By this means the pressure medium is cut off from the preliminary valve V and the fine valve F. But this closure of the cock $H_3$ would not suffice, because the defect in the telecontrol gear might be due to the fact that one of the fine valve magnets $F_5$ or $F_6$ is permanently energized. If $F_6$ were permanently energized for example the cylinder space above the piston $Z_2$ would be permanently connected through $G_{18}$, $F_{15}$, $F_{17}$ to the discharge pipe A. Such a connection would be liable to counteract the effect of the manual control device. Therefore additional cocks $HD_3$ and $HD_4$ must be provided in the pipes $F_{13}$ and $F_{15}$ situated beyond the cock $H_3$.

The defect may also be due to one of the magnets $V_5$ and $V_6$ remaining permanently energized. If the magnet $V_5$ for instance were permanently energized the cock $H_3$ would entirely prevent the motion of the liquid above the piston $G_6$ and the coarse adjustment piston could not be raised. To prevent this the cock $H_3$ is constructed in the form of a two-way cock which, when it is worked as described, connects the supply pipes $V_{13}$ and $F_{14}$ to the discharge pipe A through the branch pipe $H_7$. By this means all the pipes emanating from the cylinders $V_1$, $F_1$ and $G_5$ are connected to the discharge pipe so that the piston $G_6$ and the associated coarse slide valve is free to be moved.

In Fig. 3 a separate cylinder $G_5$ with piston $G_6$ is provided as a means for moving the coarse slide valve. But it will be obvious that the pipe $V_{16}$ could be made to issue in the space above the piston ring $G_2$, and the pipe $V_{18}$ to terminate in the space in the cylinder G beneath the piston ring $G_4$. A special cylinder $G_5$ and piston $G_6$ are to be recommended in cases in which a preliminary valve is to be placed before an existing valve gear.

Figure 4:
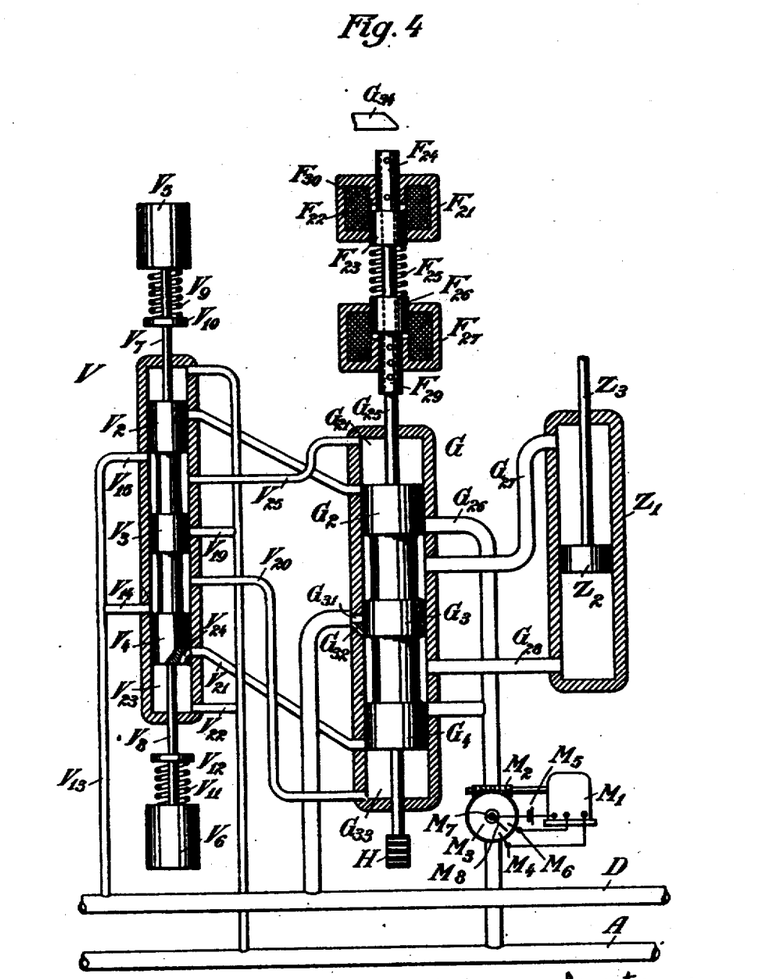
Fig. 4 is a diagrammatic sectional representation of a pressure-medium controlling gear with only two valves, and with the fine adjustment electromagnets associated with the main or coarse adjustment valve.

In the arrangement shown in Fig. 4 V is an electrically telecontrolled preliminary valve which, in turn, controls an hydraulically operated main valve G. The electrically controlled fine magnets $F_{21}$ and $F_{27}$ do not act upon a separate fine adjustment valve as in the case described above, but directly on the main valve G. $Z_1$ again denotes the operating cylinder, $Z_2$ its piston, and $Z_3$ its piston rod attached to the load (not shown).

The preliminary controlling device or valve V is restored from either operative position into its normal middle position by springs, and the corresponding restoring motions of the main controlling device or valve G are effected by hydraulic power.

The mode of operation of the fine magnets $F_{21}$ and $F_{27}$, which act directly upon the main valve G, is as follows:

Tappets $F_{24}$ and $F_{29}$ are screwed fast to the valve rod $G_{25}$ which extends through the entire main valve gear. The armatures $F_{23}$ and $F_{26}$ are mounted loosely on the rod $G_{25}$ and pressed against the tappets $F_{24}$, $F_{29}$ by a spring $F_{25}$ which tends to expand. Assuming that the fine magnet $F_{21}$ is energized by current sent through its coil $F_{22}$, its armature $F_{23}$ will be attracted. The armature $F_{23}$ imparts its motion to the tappet $F_{24}$ and thus to the rod $G_{25}$ and hereby the valve $G_2$, $G_3$, $G_4$ is lifted to such an extent that the small pressure pipe $G_{32}$ and also a small part of the mouth of the discharge pipe $G_{26}$ are opened.

The pressure medium, of which only a very small volume is thus allowed to flow, passes from the pressure pipe D through $G_{32}$ and $G_{28}$ into the space beneath the piston $Z_2$ so that the piston is lifted slowly. The pressure medium above the piston $Z_2$ is discharged through $G_{27}$ and $G_{26}$ into the discharge pipe A.

It will be assumed that at the time the fine magnet $F_{21}$ is excited the preliminary valve gear is in its normal position. Then, when the slide valve $G_2$, $G_3$, $G_4$ is lifted, the piston ring $G_4$ will open the pipe $V_{21}$, so that the pressure-medium in the space $G_{33}$ beneath the piston rings $G_4$ will be discharged through $V_{21}$, passage $V_{24}$ in the piston ring $V_4$, branch pipe $V_{22}$ into the discharge pipe A. Although a new supply of pressure medium will pass from D through $V_{13}$, $V_{14}$, $V_{20}$ into the chamber $G_{33}$ the throttling effect exerted by the pipe $V_{20}$ against the inflow of the new supply is such that the full pressure will not be produced in the said chamber $G_{33}$. But the full pressure will be acting on the piston ring $G_2$ because the pressure medium is admitted from D through $V_{13}$, $V_{15}$, $V_{25}$ into the chamber $G_{21}$ without any simultaneous discharge from this chamber taking place. It is thus seen that the magnetic attraction between the armature $F_{23}$ and the pole $F_{30}$ counteracts the hydraulic pressure in the chamber $G_{21}$. If the magnet $F_{21}$ is now deenergized the excess hydraulic pressure acting on the piston ring $G_2$ will take effect and push the slide valve $G_2$, $G_3$, $G_4$ downward until the piston ring $G_4$ recloses the mouth of the pipe $V_{21}$. At this moment the full pressure will be reestablished in the two chambers $G_{21}$ and $G_{33}$ and therefore the slide valve $G_2$, $G_3$, $G_4$ will stop the moment it reaches its middle position.

If, after the excitation of the fine magnet $F_{21}$ the magnet $V_6$ is also energized the preliminary slide valve $V_2$, $V_3$, $V_4$ will be pulled downward. This will result in the closure of the pipe $V_{21}$. The pressure medium contained in the chamber $V_{23}$ can flow out through the pipe $V_{22}$ into the discharge pipe A. The pressure medium from the supply pipe D flows through $V_{13}$, $V_{14}$, $V_{20}$ into the chamber $G_{33}$. Due to the downward motion of the preliminary slide valve the piston ring $V_2$ closes the pipe $V_{15}$ and the pressure medium in the chamber $G_{21}$ flows out through $V_{25}$, $V_{19}$ to the discharge pipe A. Therefore the full pressure acts in the chamber $G_{33}$ while the pressure in the chamber $G_{21}$ is at zero. Hence the slide valve $G_2$, $G_3$, $G_4$ is raised until the large inlet $G_{31}$ is opened. The stop $G_{34}$ arrests the upwardly moving slide the moment the rod $G_{26}$ or the tappet $F_{24}$ strikes against it.

During this operation the spring $F_{25}$ is compressed and therefore tensioned, the armature $F_{23}$ soon striking against the pole $F_{30}$ while the rod $G_{26}$ with its tappets $F_{29}$ and $F_{24}$ continues to be lifted.

When the main slide valve is in its uppermost position the pressure-medium passes unthrottled from the supply pipe D through the inlet $G_{31}$ and the pipe $G_{28}$ into the chamber beneath the piston $Z_2$ so that the full power is exerted in lifting the load. The pressure-medium above the piston $Z_2$ is discharged through $G_{27}$, $G_{26}$ into A.

As soon as the load arrives in the neighbourhood of the position into which it is to be moved it causes the circuit of the magnet $V_6$ to be opened, since in moving the load the contacts of the coarse system (24 or 25 see Fig. 1) will open the circuit of the coarse adjustment magnets, while the contacts 30 or 31 of the fine adjustment are still closed to give the fine and correct adjustment to the load to be moved. The spring $V_{11}$, which was tensioned during the downward movement of the rod $V_8$ by the plate $V_{12}$ fixed to it, lifts the valve $V_2$, $V_3$, $V_4$ and restores it to its middle position, when the magnet $V_6$ is deenergized. When the valve reaches this position the plate $V_{10}$ fixed to the valve rod $V_7$ strikes against the spring $V_9$ which opposes the movement of the valve $V_2$, $V_3$, $V_4$ beyond the middle position to such an extent that it stops when it reaches this position. The pipe $V_{21}$ will then be open again so that the pressure in the chamber $G_{33}$ will drop, while the full pressure will be maintained in the chamber $G_{21}$. The excess pressure in the chamber $G_{21}$ will force the valve $G_2$, $G_3$, $G_4$ downward. But as the fine magnet $F_{21}$ is still energized the tappet $F_{24}$ will strike against the attracted armature $F_{23}$ so that in spite of the excess pressure in the chamber $G_{21}$, the slide valve $G_2$, $G_3$, $G_4$ will only be lowered to such an extent that the passage $G_{32}$ still remains open. Therefore the load will continue to be lifted at a reduced speed until, on its reaching the desired position, the circuit of the magnet $F_{21}$ is opened also. The slide valve $G_2$, $G_3$, $G_4$ will then move down into its middle position and the motion of the load will be stopped in the manner hereinbefore described.

If the load is to be lowered instead of raised the operation of the piston $Z_1$ will be controlled in a similar manner to that just described, but by the magnets $F_{27}$ and $V_5$.

If the electrical telecontrol gear should get out of order a manual control device H can be put into operation in the same way as in the arrangement shown in Fig. 3.

For regulating the speed of the load a telecontrolled throttle valve $M_3$, Fig. 4, is connected in the discharge pipe of the main valve gear. $M_7$ represents the armature of a telecontrolled electric receiver which rotates a contact finger $M_8$. On this finger $M_8$ being made to touch the contact $M_4$ mounted on the valve $M_3$ the motor $M_1$ is caused to revolve in a clockwise direction due to the closure of its circuit which extends from the battery $M_5$ through the contacts $M_8$, $M_4$ and the one coil of the motor. The motor operates through the worm $M_2$ to close the valve $M_3$ by turning it clockwise. This rotation of the valve continues until the contact between contact members $M_8$ and $M_4$ is broken, which will occur when the contact finger $M_8$ pushed round by the telecontrol device $M_7$ comes to a standstill. The contact $M_4$ will then be rotated a little further on account of the inertia of the motor $M_1$ so that the contacts $M_4$ and $M_8$ will be separated. Conversely, if the contact finger or pointer $M_8$ is turned by the telecontrol gear in the opposite direction so as to touch the contact $M_6$, which is also mounted on the valve $M_3$, the motor $M_1$ will rotate counterclockwise and open the valve $M_3$. The valve $M_3$ is a throttle valve which obstructs the discharge of the pressure medium from the operating cylinder $Z_1$.

Figure 5:
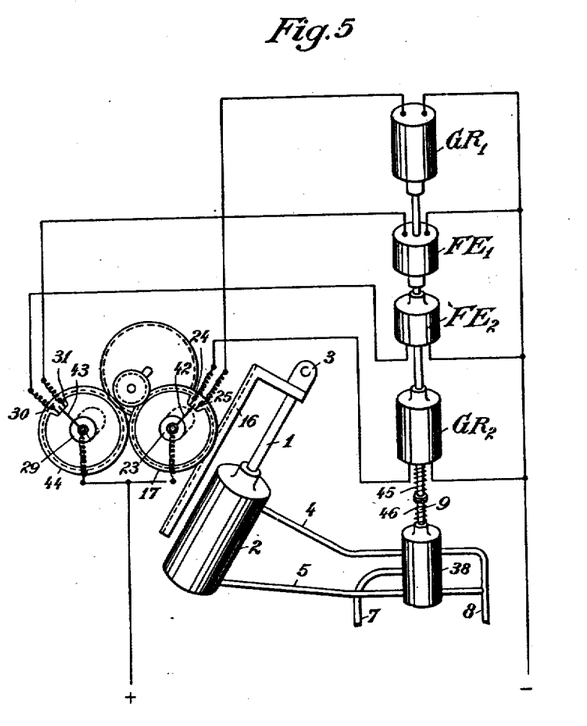
Fig. 5 is an arrangement in which the speed of closure of the valve is reduced by a stop against which the valve rod strikes during its return to its normal position and which is associated with the fine adjustment electromagnet.
Figure 6:
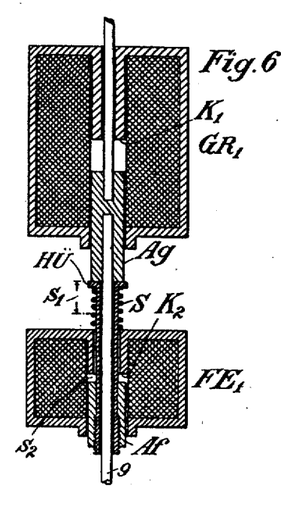
Figs. 6 and 8 show types of couplings between the armature of a fine adjustment magnet and a valve rod.
Figure 7:
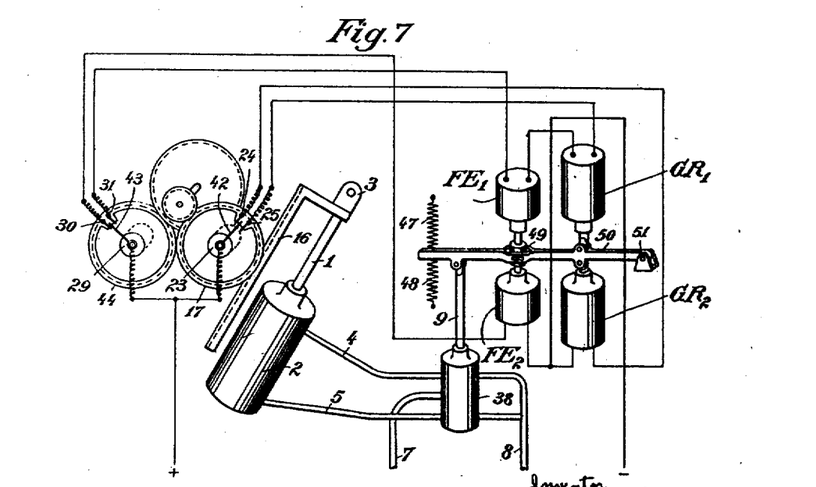
Fig. 7 is a modification of Fig. 5.
Figure 8:
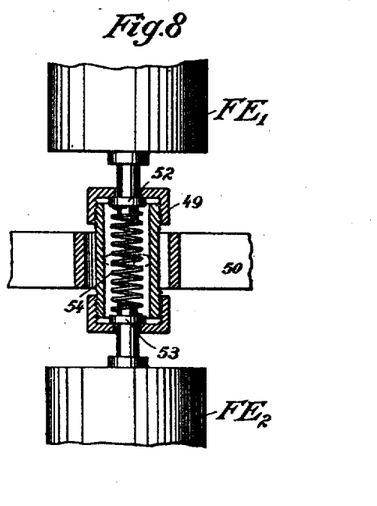

Figs. 5 to 8 illustrate an arrangement in which, in order to reduce the speed of closure of the valve, the movable member of the valve gear, on returning from its operated position into its normal position, strikes against a tappet controlled by the fine adjustment gear. Figs. 5 and 7 show two different ways of arranging the electromagnets. Fig. 6 shows, on an enlarged scale, one type of a coupling between the armature of a fine magnet and the rods of the pressure medium controlling device, and Fig. 8 shows another type of such a coupling.

With the exception of the arrangement of the electromagnets, the valve rods, and the coupling connecting the latter to the fine magnets, the systems of Figs. 5 and 7 are practically similar. In both cases the piston 1 moved in the cylinder 2 by a medium under pressure is connected by means of the eye 3 to the gun or the like (not shown). The pressure medium is conducted into the cylinder 2 through the pipes 4 and 5 via the slide valve 38. The pressure medium passes to the slide valve cylinder through the pipe 7 and is discharged from the chambers at the top and bottom of the piston through the pipe 8. The rod 9 of the valve piston is actuated by the coarse adjustment magnets $GR_1$, $GR_2$, and the fine adjustment magnets $FE_1$ and $FE_2$. The magnets $FE_1$ and $GR_1$ affect the raising, and the magnets $FE_2$ and $GR_2$ the lowering of the gun. The coarse magnets operate to open the passages of the controlling device or valve 38 entirely, so as to raise or lower the gun rapidly, while the fine magnets only cause the said passages to be opened slightly, so that the load is moved slowly in the one direction or the other. The circuits of the fine magnets $FE_1$ and $FE_2$ are controlled by the receiver 29, and the circuits of the coarse magnets $GR_1$, $GR_2$ by the receiver 23. The receivers 23 and 29 are set by means of two transmitters (not shown). According as the receiver 23 and 29 are rotated clockwise or counterclockwise their contact pointers 42, 43 will touch the peripheral contacts 25 and 31, or 24 and 30, and the corresponding electromagnets $GR_1$ and $FE_1$, or $GR_2$ and $FE_2$, and will be energized and the pressure medium thus caused to flow into the space above or beneath the piston in the cylinder 2. By the ensuing upward or downward motion of the piston rod 1 the gun connected thereto will be elevated correspondingly. At the same time rack 16 will operate to rotate the spur-wheels 17, 44 with their contacts 24, 25 and 30, 31 respectively in the same direction as the receivers were previously turned, and this rotary movement will continue until the contact between the receiver contact pointers 42, 43 and their corresponding peripheral contacts is broken. On the ensuing deenergization of the corresponding electromagnets the slide valve 38 in the arrangement of Fig. 5 is restored by the springs 45, 46 (or in the arrangement of Fig. 7 by the springs 47, 48) to its middle closed position.

In Fig. 5 the magnets $GR_1$, $FE_1$, $FE_2$, $GR_2$ are arranged on the valve rod 9 and beneath one another in the order named, the rod 9 being lengthened accordingly. The magnets $GR_1$ and $FE_1$ for lifting the gun are thus situated above the two magnets $FE_2$ and $GR_2$ for lowering the gun, and the fine magnets $FE_1$, $FE_2$ are between the coarse magnets $GR_1$, $GR_2$. As shown in Fig. 6 the armature $Ag$ of the coarse magnet $GR_1$ is firmly fixed on the rod 9 which is arranged to slide freely through the armature $Af$ of the fine magnet $FE_1$. The armature $Af$ of the fine magnet is fixed, as by a thread, to a sleeve HÜ. When the device is in its normal position the armature $Ag$ lies upon the top end of the sleeve HÜ. When the fine magnet $FE_1$ is energized it lifts its armature up to its pole $K_2$ thus causing it to rise a certain distance $s_2$ and as the sleeve HÜ fixed to the said armature $Af$ abuts against the lower end of the armature $Ag$ of $GR_1$ fixed to the rod 9, this rod 9 is also lifted to the extent of the distance $s_2$. Thus the armature $Af$ of the fine magnet $FE_1$ and the valve rod 9 do not move relatively to each other during the upward travel imparted to them by the energization of the fine magnet.

On the subsequent energization of the coarse magnet $GR_1$ this magnet raises its armature $Ag$, which has already been lifted for the distance $s_2$, right up to the pole $K_1$. In executing this second motion the rod 9 slips through the sleeve HÜ. When the magnet $GR_1$ is deenergized the armature $Ag$ first drops back on to the top of the sleeve HÜ. But as the fine magnet $FE_1$ will still be energized the slide member in the valve 38 will remain slightly raised and keep the passages leading through it slightly open, thus causing the operation of raising the gun to proceed slowly. When the fine magnet $FE_1$ is also deenergized both armatures $Af$ and $Ag$ will be restored by the springs 45, 46 (Fig. 5) into their normal position, in which they are shown in the drawing, and this results in the pressure medium being completely cut off from the cylinder 2.

If on the deenergization of the coarse magnet $GR_1$ the armature $Ag$ fixed to the rod 9 did not strike against the stop HÜ the force of its fall would be such that it would plunge down past the position of fine adjustment and even past the normal or zero position. But the resistance that the armature of the fine magnet offers to the return of the rod to its normal position will suffice to prevent oscillations of the movable valve member to either side of its normal position, even if the armature of the energized fine magnet should be torn from its pole.

When the electromagnets $FE_2$ and $GR_2$ are energized the sleeve HÜ with the armature $Af$ is pushed down by the armature $Ag$ past the middle position, the extent of this movement past the middle position being equal to the distance $s_1$. The restoration of HÜ and $Af$ into the normal position, in which the top of HÜ touches $Ag$, is performed by the helical spring S when the magnets $GR_2$ and $FE_2$ are deenergized.

The arrangement and operation of the parts associated with the magnets $GR_2$ and $FE_2$ are the same as those of the magnets $GR_1$ and $FE_1$.

In the telecontrol arrangement shown in Figs. 7 and 8 the fine magnets $FE_1$, $FE_2$, on the one hand, and the coarse magnets $GR_1$, $GR_2$ on the other, are linked to different points of a lever 50 which is fulcrumed at 51 and pivotally attached to the valve rod 9. The coupling of the armature of the fine magnet to the lever arrangement is carried out in the following manner (Fig. 8): A barrel 49 composed of three parts is connected to the lever 50 by pivots capable of moving laterally in slots in the said lever, as Figure 7 shows. The top and bottom ends of the barrel embrace the heads 52 and 53 of the armatures of $FE_1$ and $FE_2$ in such a manner that when these magnets are energized the said heads take the barrel 49 and the lever 50 along with them, but move inward towards the middle of the barrel when the barrel 49 and the lever 50 are moved (by a coarse magnet for instance) further than the distance corresponding to the stroke of the armature of a fine magnet. Thus if the fine magnet $FE_1$, for example, is energized it will lift the lever 50 by means of the barrel 49 to an extent corresponding to the length of stroke of its armature. On the subsequent energization of the coarse magnet $GR_1$, which is linked to the lever 50 by playless pivots, the lever 50 is tilted up further. The armature of $FE_1$ cannot participate in this further movement of the lever 50 because it abuts against the pole of $FE_1$ when it is attracted by it. The head 52 of the armature of $FE_1$ therefore moves further into the barrel 49. If the magnet $GR_1$ is now deenergized the spring 48 will move the lever 50 downward towards its middle or normal position. But as the magnet $FE_1$ is still energized the downward movement of the lever 50 will be arrested before it reaches its normal position due to the cap of barrel striking against the head 52 of the armature of $FE_1$ which is still attracted. The springs 47, 48 will only be able to restore the lever 50 and the valve 38 attached thereto to normal when its fine magnet $FE_1$ is also deenergized. The light spring 54 is only inserted between the heads 52 and 53 of the armatures in order to press the said heads against the top and bottom of the barrel 49 while the magnets are deenergized. By this means the heads of the armature are prevented from executing lost motion in the barrel during the initial period of their strokes when the fine magnets are energized.

The point of attachment of the armatures of the fine magnets is further from the fulcrum 51 of the lever than that of the coarse magnets in order to obtain an ample stroke of the armatures of the fine magnets $FE_1$ and $FE_2$ so as to facilitate their adjustment.

I claim:

1. In combination with a power device adapted to be operated by a pressure-medium and to move a heavy object into a desired position, an electric telecontrol arrangement comprising; a device for controlling the action of the said pressure-medium, a primary electromagnet arrangement for affecting the said controlling device to produce a rapid action of the pressure medium, a secondary electromagnet arrangement for operating the said controlling device to produce a slower action of the pressure medium, a coarse adjustment receiver cooperating with the primary magnet arrangement, and a fine adjustment receiver cooperating with the secondary electromagnet arrangement.

2. In combination with a hydraulic power device adapted to direct a heavy cannon, an electric telecontrol arrangement comprising; a device for controlling the action of the power device, a primary electromagnet arrangement for affecting the said controlling device to produce a rapid action of the power device, a secondary electromagnet arrangement for affecting the said controlling device to produce a slower action of the power device, an electric coarse adjustment receiver cooperating with the primary magnet arrangement, and a fine adjustment receiver cooperating with the secondary electromagnet arrangement.

3. In combination with a hydraulic power device adapted to direct a heavy cannon, an electric telecontrol arrangement comprising; a valve arrangement for controlling the action of the water in the power device, a primary electromagnet arrangement for affecting the said valve arrangement to produce a rapid action of the power device, a secondary electromagnet arrangement for affecting the said valve arrangement to produce a slower action of the power device, an electric coarse adjustment receiver cooperating with the primary magnet arrangement, and a fine adjustment receiver cooperating with the secondary electromagnet arrangement.

4. In combination with a power device adapted to be operated by a pressure medium and to direct a heavy cannon, an electric telecontrol arrangement comprising; a primary pressure-medium controlling device for effecting rapid movements by means of the power device, a secondary pressure medium controlling device for effecting slower movements by means of the power device, a primary electromagnet arrangement for operating the primary pressure-medium controlling device, a secondary electromagnet arrangement for operating the secondary pressure-medium controlling device, a coarse adjustment receiver cooperating with the primary electromagnet arrangement, and a fine adjustment receiver cooperating with the secondary electromagnet arrangement.

5. In combination with a power device adapted to be operated by a pressure medium and to direct a heavy cannon, an electric telecontrol arrangement comprising; a primary pressure-medium controlling device for effecting rapid movements by means of the power device, a secondary pressure medium controlling device for effecting slower movements by means of the power device, a preliminary pressure-medium controlling device for actuating the said primary pressure-medium controlling device, a primary electromagnet arrangement for operating the preliminary pressure-medium controlling device, a secondary electromagnet arrangement for operating the secondary pressure-medium controlling device, a coarse adjustment receiver cooperating with the primary electromagnet arrangement, and a fine adjustment receiver cooperating with the secondary electromagnet arrangement.

6. In combination with a power device adapted to be operated by a pressure-medium and to move a heavy object into a desired position, an electric telecontrol arrangement comprising; a device for controlling the action of the said pressure-medium, a primary electromagnet arrangement for affecting the said controlling device to produce a rapid action of the pressure medium, a secondary electromagnet arrangement for operating the said controlling device to produce a slower action of the pressure medium, a coarse adjustment receiver cooperating with the primary magnet arrangement, and a fine adjustment receiver cooperating with the secondary electromagnet arrangement; and local manual means for operating the said controlling device.

7. In combination with a hydraulic power device adapted to direct a heavy cannon, an electric telecontrol arrangement comprising; a device for controlling the action of the power device, a primary electromagnet arrangement for affecting the said controlling device to produce a rapid action of the power device, a secondary electromagnet arrangement for affecting the said controlling device to produce a slower action of the power device, an electric coarse adjustment receiver cooperating with the primary magnet arrangement, and a fine adjustment receiver cooperating with the secondary electromagnet arrangement; and a local manual means for operating the said controlling device.

8. In combination with a power device adapted to be operated by a pressure medium and to direct a heavy cannon; a pressure medium controlling device for controlling the action of the power device; an electric telecontrol arrangement comprising, a primary electromagnet arrangement for affecting the said controlling device to produce a rapid action of the power device, a secondary electromagnet arrangement for affecting the said controlling device to produce a slower action of the power device; an electric coarse adjustment receiver cooperating with the primary magnet arrangement, and a fine adjustment receiver cooperating with the secondary electromagnet arrangement; a local manual means for operating the said controlling device, and means for rendering the said telecontrol arrangement inoperative when the said local manual means is used.

9. In combination with a power device adapted to be operated by a pressure medium and to direct a heavy cannon; a primary pressure-medium controlling device for effecting rapid movements by means of the power device; a secondary pressure medium controlling device for effecting slower movements by means of the power device; an electric telecontrol arrangement comprising; a primary electromagnet arrangement for operating the primary pressure-medium controlling device, a secondary electromagnet arrangement for operating the secondary pressure-medium controlling device, a coarse adjustment receiver cooperating with the primary electromagnet arrangement, and a fine adjustment receiver cooperating with the secondary electromagnet arrangement; a local manual means for operating the said primary pressure-medium controlling device; and means for rendering the said electric telecontrol arrangement and the said secondary pressure-medium controlling device inoperative when the said local manual means is used.

In testimony whereof I affix my signature.

PAUL KAMINSKI.